United States Patent
Borrelli et al.

[15] 3,639,771
[45] Feb. 1, 1972

[54] BISTABLE OPTICAL ELEMENTS USING TRANSPARENT FERROELECTRIC GLASS CERAMICS

[72] Inventors: Nicholas F. Borrelli, 935 West Water St., Elmira, N.Y. 14905; Margaret M. Layton, 2970 Olcott Road, Big Flats, N.Y. 14814

[22] Filed: Oct. 9, 1969

[21] Appl. No.: 865,141

[52] U.S. Cl....................250/225, 250/220 MX, 252/62.9, 340/173 SS, 350/150, 350/157, 350/160 R
[51] Int. Cl.............................................................G02f 1/18
[58] Field of Search...........250/220 MX, 225; 350/150, 157, 350/160; 252/62.9; 340/173 SS

[56] References Cited

UNITED STATES PATENTS 3,467,463  9/1969  Borrelli..................................350/150
3,469,206  9/1969  Harris...............................350/150 X
3,499,704  3/1970  Land..................................350/150 X
3,512,864  5/1970  Haertling..............................350/150

*Primary Examiner*—James W. Lawrence
*Assistant Examiner*—C. M. Leedom
*Attorney*—Clarence R. Patty, Jr., Walter S. Zebrowski and William J. Simmons, Jr.

[57] ABSTRACT

A bistable light switch including a transparent ferroelectric glass-ceramic body which exhibits ferroelectric hysteresis. The body can be prepolarized so that the application of electric fields of equal amplitude but opposite polarity switches the device between two stable states which exhibit different birefringence characteristics. When such a body is disposed between a source of polarized light and a polarization analyzer, the light output from the analyzer is determined by the polarity of the field that was last applied to the body.

12 Claims, 5 Drawing Figures

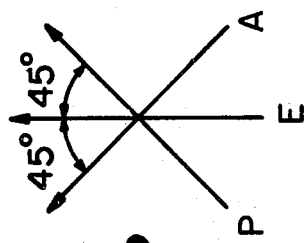
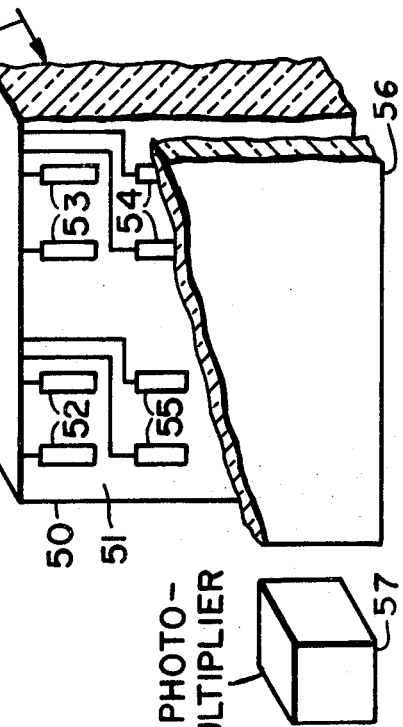
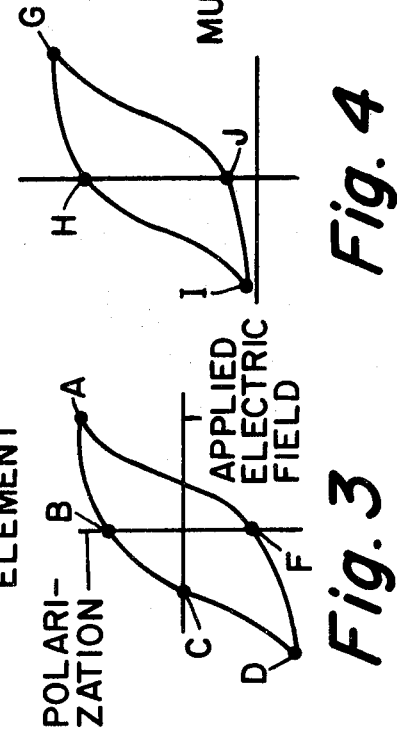
INVENTORS.
Nicholas F. Borrelli
Margaret M. Layton
BY
William J. Simmons Jr
ATTORNEY

BISTABLE OPTICAL ELEMENTS USING TRANSPARENT FERROELECTRIC GLASS CERAMICS

BACKGROUND OF THE INVENTION

This invention relates to electro-optic devices for use in bistable light switches and, more particularly, to such devices employing novel and improved active elements for producing the electro-optic effect. Such devices find utility in optical displays and memories.

Heretofore, electro-optic devices for use in bistable light switches have been made from either single crystals or polycrystalline sintered material. Single crystals are expensive and cannot be grown in sufficiently large sizes. Wafers of sintered polycrystalline material are also expensive since such wafers are made by first preparing a polycrystalline composition in powder form by solid state reaction of the proper ingredients and then hot pressing these powders at about 1,200° C. while applying pressure thereto. One such material consists of closely packed crystals of $Pb(Zr_xTi_{1-x})O_3$ separated by a boundary layer the thickness of which is controlled by the addition of small amounts of La or Bi. Although these polycrystalline wafers are more easily made than single crystals, they are still relatively expensive and are limited in size. Other disadvantages of polycrystalline ceramic wafers will be hereinafter discussed.

The present invention results from the discovery that certain transparent ferroelectric polycrystalline materials dispersed in a glassy matrix exhibit an effective bistable electro-optic effect. The term "ferroelectric" generally relates to dipolar ordering and includes both parallel ordering and antiparallel ordering of dipoles. Ferroelectric materials are suitable for use in the bistable light switch of this invention only if they exhibit a ferroelectric hysteresis, thereby retaining a remnant polarization even after removal of the polarizing electric field. It has been observed that some ferroelectric glass-ceramic compositions exhibit a ferroelectric hysteresis if the size of the crystallites thereof is between 1,000 and 2,000 A. and that the same compositions did not exhibit a ferroelectric hysteresis if the crystallite size was less than 1,000 A. Although the ferroelectric hysteresis effect is enhanced as the crystallite size increases above 2,000 A., such materials are not transparent and are therefore not useable in bistable light switches. Although it has been observed that only glass-ceramic materials having crystallites in the range of 1,000–2,000 A. possess both transparency and ferroelectric hysteresis, materials having crystallites larger than 2,000 A. may be transparent and therefore come within the present invention if the refractive index of the glassy matrix is above the level of presently available ferroelectric glass-ceramics.

In U.S. Pat. No. 3,114,066 to R. E. Allen and A. Herczog there is described a group of high dielectric constant semicrystalline bodies produced by thermal conversion of suitable glasses. For the glasses taught by this patent to be transformed into semicrystalline bodies having properties which satisfy the objects of that patent, i.e., transparency and high dielectric constant, these glasses must be heat treated at a rate of up to 1,000° C. per hour to a temperature of 700°–950° C., for a time between 1 hour and 24 hours, and the resultant article thereafter cooled to room temperature at a rate of up to 500° C. per hour. Such heat treatment causes precipitation of a multiplicity of submicroscopic, crystalline niobate particles within the remaining glassy matrix, substantially all the crystallites being less than 1,000 A. in diameter so that the resultant article retains a very substantial transparency to visible radiation.

Light modulators utilizing transparent semicrystalline bodies of the type disclosed in the above-identified Allen et al. patent are disclosed in U.S. Pat. No. 3,467,463 to N. F. Borrelli, A. Herczog and R. D. Maurer. These light modulators are based on materials having crystallites which are sufficiently small in size so that ferroelectric hysteresis cannot exist. In accordance with the Borrelli et al. patent, variations in an electric field applied across a transparent semicrystalline body produce variations in the refractive index of the body in order to modulate the intensity of polarized light passing through the device. The device comprises a controllable birefringent element located between two polarizers having their planes of polarization at right angles to one another. The light input passes through the first polarizer and enters the element as plane polarized light. In the absence of an electrical field across the active element, the plane polarized light passes through the element without rotation and is totally absorbed by the second polarizer. However, when an electrical field is applied to the element, the element becomes birefringent, and the light emerges from the element as elliptically or circularly polarized light, part of which passes through the second polarizer which is referred to as an analyzer. Removal of the electric field causes the element to revert to an optically isotropic state. An output device such as a photomultiplier is placed on the side of the analyzer remote from the active element and provides an electrical output from the device. The controllable birefringent element consists of a glass ceramic material containing crystals of sufficiently small size that transparency is maintained, and the overall electro optic device functions as a light modulator.

In an electro-optic device such as that described in the above-identified Borrelli et al. patent, wherein the light emanating from a controllable birefringent element must pass through a polarization analyzer, the birefringent element must be transparent to the extend that the polarization of the light emanating therefrom is discernable.

Glass ceramic materials such as those disclosed in the above-identified Allen et al. patent, a class of which are also disclosed in U.S. Pat. application Ser. No. 733,293 entitled "High Dielectric Constant Glass-Ceramic Articles" filed May 31, 1968 in the name of A. Herczog and M. Layton, are transparent when the size of the crystallites therein is less than about 2,000 A. Those of the glass-ceramic compositions specifically taught by the above-identified Allen et al. patent and Herczog et al. application and indeed, any transparent, ferroelectric glass-ceramic material which exhibits ferroelectric hysteresis can be used as the electro-optic element of the bistable light switch of this invention.

For a material to be suitable for use in a bistable electro-optic device, it must exhibit ferroelectric hysteresis properties and a sufficiently high remnant polarization, and it must be such that the polarization of an input light beam is preserved in the beam emanating from the material. It has been observed that hysteresis along with transparency is a function of crystal size. The existence of ferroelectric hysteresis in a glass-ceramic material depends critically on its crystallite size. It has been generally found that for crystallite sizes less than 1,000 A. ferromagnetic hysteresis is not observed, and indeed, its state is termed "superparamagnetic."

Table I shows both the polarization P and the remnant polarization $P_{rem}$ as a function of crystal size for $Na_{0.5}K_{0.5}NbO_3$. The applied electric field was 16 kv./cm. The temperatures listed in parentheses in table I are the temperatures at which the glass was heat treated and thereby thermally transformed into semicrystalline bodies.

TABLE I

| Material | Crystal Size | P $\mu c./cm.^2$ | $P_{rem}$ $\mu c./cm.^2$ |
|---|---|---|---|
| Ceramic[a] | 6μ | 35 | 33 |
| Glass-ceramic (1,075° C.) | ~1μ | 4.2 | 0.8 |
| Glass-ceramic (925° C.) | <2,000 A. | 1.0 | ~0.2 |

(a) G. H. Haertling, J. Am. Ceram. Soc. 50, 329 (1967).

Both the ceramic material and the glass ceramic material heat treated at 1,075° C. were nontransparent. Only those glass ceramic materials which were heated at such a temperature that the crystal size was below about 2,000 A. were transparent. The data shown in table I indicates that for a given applied electric field, there is a strong dependence of the polarization on crystallite size. Since crystallite size influences properties such as the remnant polarization and coercive field in polycrystalline systems, it is difficult to ascertain the additional effect introduced by the intervening glass phase which amounts to about 30 percent by volume. It is noted that the glass ceramic in which the crystallite size is less than about 2,000 A., the polarization and remnant polarization were both small but were large enough to prepare from this material a birefringent element for use in a bistable light switch.

SUMMARY OF THE INVENTION

It is an object of the present invention to provide a bistable light switch utilizing a novel electro-optic element. A further object of the present invention is to provide a planar array of bistable light switches, the dimensions of which array are larger than heretofore possible.

Briefly, the bistable electro-optic device of this invention is capable of switching between at least two stable states the polarization characteristics of a plane polarized light beam. This device comprises a transparent ferroelectric glass-ceramic body including submicroscopic crystallites embedded in a glassy matrix. The size of the crystallites is such that the body is transparent and exhibits a ferroelectric hysteresis loop. The body has birefringence characteristics which are modifiable in response to variations in an electric field imposed thereacross and which modifiable characteristics are retained after removal of the electric field from the body. The electro-optic device further includes means for applying an electric field across the body.

BRIEF DESCRIPTION OF THE DRAWINGS

FIG. 1 is a schematic representation of a bistable light switch embodying a novel glass-ceramic electro-optic element.

FIG. 2 is a schematic illustration of the relationship between the direction of the applied electric field and the planes of polarization of the polarizer and analyzer of FIG. 1.

FIG. 3 is a diagram of a typical ferroelectric hysteresis loop.

FIG. 4 is a diagram of a ferroelectric hysteresis loop which has been displaced by prepolarizing.

FIG. 5 is a planar array of bistable light switches.

DETAILED DESCRIPTION

Referring to the drawing, a light source 10, for example a gas laser with an output at 6,328 A., directs a light beam along a light transmission path indicated by broken line 12 to a polarizer 14. After passing through polarizer 14, the light enters active element 16 which is in the form of a rectangular parallel piped, the dimensions of which in one actual embodiment were 1 cm. by 1 mm. by 0.63 mm. The element is preferably immersed in a silicone oil (not shown) to avoid dielectric breakdown of ambient air at the voltages necessary for operation of the device. The light passes through the 0.63 mm. dimension of the element, and a pulsed electric field of 100 kv. per cm. is applied transverse to the direction of the light, across the 1 mm. direction, from electric pulse source 18 through electrodes 15 and 17 in contact with element 16. Analyzer 20 has its plane of polarization perpendicular to that of polarizer 14. The electric field resulting from the voltage applied to the electrodes 15 and 17 is applied at an angle of 45° with each of the planes of polarization of polarizer 14 and analyzer 20. This is indicated in FIG. 2, wherein arrows P and A illustrate the planes of polarization of polarizer 14 and analyzer 20, respectively, while arrow E indicates the direction of the electric field.

Element 16 is a body of transparent ferroelectric glass-ceramic material which may consist of any one of the compositions disclosed in the hereinabove described Allen et al. or Herczog et al. patents which exhibits a ferroelectric hysteresis loop. It could also consist of a glass-ceramic material made from one of the glasses, the compositions of which are set forth on the oxide basis in percent by weight in table II. All of these glass-ceramic materials contain crystals of an oxygen-octahedral lattice configuration. The glasses in table II are of the general type disclosed in the Allen et al. patent. This table not only records the glass compositions but also the crystal structure of the phases present and the molar ratios B/N and B/A.

TABLE II

|  | 1 | 2 |  |
|---|---|---|---|
| $Na_2O$ | 9.6 | 12.0 | 12.0 |
| $K_2O$ | 9.9 | — |  |
| CdO | — | 8.4 |  |
| $Nb_2O_5$ | 70.0 | 69.0 |  |
| SiO | 10.5 | 10.6 |  |
| Main Crystal Structure | $A^+B^{5+}O_3$ | $A^+B^{5+}O_3$ |  |
| B/N | 3.0 | 2.9 |  |
| B/A | 1.0 | 1.0 |  |

True ferroelectric behavior exists in certain transparent ferroelectric glass-ceramic compositions of the type disclosed herein if the crystal size is maintained at a value of approximately 1,000–2,000 A. The production of glass-ceramic articles having the required crystal size comprises three general steps: (1) a glass-forming batch which may consist of one of the examples set forth in table II hereinabove or one of the examples set forth in the Allen et al. or Herczog et al. patents, is melted agent; (2) this melt is simultaneously cooled to a glass and an article of the desired configuration shaped therefrom; and (3) the glass article is subjected to a particular time-temperature schedule whereby nuclei are initially developed within the glass which provides sites for the growth of crystals thereon as the heat treatment is continued. Inasmuch as this crystallization in situ of the glass article is the result of substantially simultaneous growth of crystals on countless nuclei, a glass-ceramic article has a structure consisting of relatively uniformly sized, fine-grain crystals dispersed in a residual glass matrix, the crystals constituting at least 50 percent by weight and, frequently, over 75 percent by weight of the article. This very high crystal content yields a product demonstrating chemical and physical properties which are normally quite different from those exhibited by the parent glass article but which are more similar in character to those of a crystalline ceramic article. Since the crystallization occurs in situ, the resultant glass-ceramic article is nonporous and free from voids. The dimensions of such glass-ceramic articles can be much larger than those of sintered ceramic articles.

The crystal size is a function of the heat treatment schedule to which a glass article is subjected and varies in accordance with the composition of the glass. Table II of the above-identified Herczog et al. patent application records the range of temperatures to which each example was subjected in the crystallization step. Heat treatment at the higher of the two listed temperatures produces an article having crystallites between 1,000 A. and 2,000 A. The glass identified as example 2 of table II hereinabove was transformed into a glass-ceramic material the crystal size of which was less than 2,000 A. by heating the glass to 925° C.

FIG. 3 shows a typical hysteresis loop for a ferroelectric bistable optical element. If a voltage E is applied to a multidomain ferroelectric material, the material will respond with a polarization $P_A$. Upon removing the field, the polarization will return along line AB and remain at a remnant polarization $P_B$. This condition optically manifests itself as a permanent birefringence which can be described as follows:

$$\Delta n \sim r P_B^2$$

where r is the electro-optic constant. To remove this polarization an electrical field whose value corresponds to point C in FIG. 3 would have to be applied to the electro-optic element. This field is referred to as the coercive field.

Thus, if an electrical pulse equal in amplitude to $E_A$ where applied by the source 18 to the electrodes 15 and 17, a remnant polarization $P_B$ would exist within the electro-optic element 16 even after cessation of the field. Optically this manifests itself as a change from an optically isotropic state to a birefringent state. This effect is utilized to provide a bistable light switch in the following manner. No light passes the analyzer 20 when the electro-optic element 16 is unpolarized. After application of the short duration voltage pulse $E_A$, the remnant birefringence due to the remnant polarization is given by the following equation.

$$\Delta n_R = g P_R^2$$

where $\Delta n$ is the difference in index between the poled direction and the direction perpendicular thereto, $g$ is the electro-optic constant of the glass-ceramic material, and $P_R$ is the induced remnant polarization. The transmission through the optical system in this state is given by the following equation.

$$T = \sin^2 \frac{\pi l}{\lambda} g P_R^2,$$

where $l$ is the optical length and $\lambda$ is the wavelength of light. The light passing through analyzer 20 may be detected visually or by photomultiplier 22, the output of which is connected to amplifier 24. The voltage appearing at the output terminal 26 is indicative of the state of the electro-optic element 16. The light output from the analyzer 20 can be switched off by applying across the element 16 and electric field the value of which corresponds to point C in FIG. 3. However, it is often difficult to apply the precise electric field $E_C$ necessary for complete removal of remnant polarization.

It may not always be convenient to provide pulses of unequal amplitude for polarizing and depolarizing the electro-optic element 16. Means will therefore be described for utilizing pulses of equal amplitude and opposite polarity for switching the remnant polarization of the element 16 between a high level and a low level. Referring again to FIG. 3, the application of a pulse equal in amplitude to the original pulse $E_A$ but reversed in polarity would induce a polarization $P_D$ which is equal to $-P_A$. When the electrical field returned to zero, the remnant polarization would then be $P_F$ which is equal to $-P_B$. This condition is optically indistinguishable from that which resulted from a remnant polarization $P_R$. Thus, optically distinguishable conditions cannot usually be obtained by simply applying pulses of opposite polarity but equal amplitudes to the electro-optic element.

Pulses of equal amplitude and opposite polarity can be used to switch the light output from the analyzer 20 between high and low states if the electro-optic element 16 is prepoled so that a significant domain alignment is achieved. This is achieved by closing a switch 30 and thereby applying a voltage from the electrical bias source 31 across the element 16. The time required to prepole the element 16 depends upon the temperature of the element and the value of the prepoling field. The results of prepoling are illustrated in FIG. 4 wherein it can be seen that the hysteresis loop is displaced along the y-axis. Thus, when the electro-optic element is pulsed with a field $E_G$, a remnant polarization $P_H$ exists after the field is removed. If a field $E_I$ is thereafter applied across the electro-optic element, a remnant polarization $P_J$ will exist after the latter field is removed. The extent of prepoling may be such that the remnant polarization $P_J$ equals 0. After the electro-optic element has been prepoled in this manner, the application of electrical pulses of equal amplitudes and opposite polarities will cause the light emanating from the analyzer 20 to be switched between high and low levels.

If a sample is prepoled at room temperature, the effect thereof slowly dissipates. However, if the prepoling field is applied to the sample while it is maintained at an elevated temperature of about 200° C. the electro-optic element becomes permanently prepolarized. Permanent prepoling is preferred since it eliminates the need for prepoling circuitry.

It was stated hereinabove that glass ceramic materials can be advantageously formed into large sheets. FIG. 5 shows a relatively large plate 50 of glass-ceramic material having pairs of electrodes 52, 53, 54 and 55 on one surface thereof. Conductive leads extend from each electrode to one of the edges of the plate 50. Numerous other pairs of electrodes may be disposed on the surface 51. The configuration shown in FIG. 5 can be used as a flat digital display or a memory array. Each set of electrodes on the surface 51 acts in conjunction with the glass-ceramic material therebetween to form separate light switches of the type shown in FIG. 1. A polarized light source may be disposed adjacent one side of the plate 50 and an analyzer 56 may be disposed adjacent the opposite side thereof. The application of an electrical pulse across a set of electrodes causes light to emanate from a corresponding point on the analyzer. This light output persists until the proper opposite polarity pulse is applied across the same pair of electrodes. This device is preferably operated in the prepolarized mode in accordance with the hysteresis diagram of FIG. 4. Further, it is preferred that this device be permanently prepoled to simplify the operation thereof as well as the circuitry associated therewith. It is to be understood, however, that this device could also be operated in accordance with the diagram illustrated in FIG. 3.

If the device of FIG. 5 is to function as a digital display, proper pairs of electrodes are pulsed to create the desired optical display. A single polarized light source can be used to transilluminate the plate 50 and the desired display is visible on the output side of the analyzer 56.

The device of FIG. 5 can be used as an optical memory, in which case the panel 50 is scanned by a polarized light source which is focused to a spot as large as the area between electrodes in an electrode pair. When the light beam is deflected to a given element or electrode pair area, the output from a photomultiplier 57 indicates the bistable state to which that element of the array has been switched.

Glass-ceramic materials used in the electro-optic devices of this invention consist of a crystalline phase which develops within a glass matrix. The crystallites in this material amount to about 70 vol. percent. The glass matrix is especially advantageous to the embodiment of FIG. 5. When the glass ceramic material between pairs of electrodes is subjected to a prepoling field, stresses are induced which would tend to crack the material. The glass matrix permits a slight reorientation of crystallites and thereby helps to dissipate this induced stress. Wafers of sintered polycrystalline material prepared by sintering polycrystalline powders do not have this advantage since the closely packed crystals in such material are separated by a thin boundary layer which does not provide the stress relieving advantage provided by a glass matrix. Moreover, the optical path length in glass ceramic bodies can be up to 10 times greater than that of sintered polycrystalline bodies and yet both bodies will exhibit the same transparency. This greater thickness permits the manufacture of glass-ceramic bodies which are stronger and larger than sintered polycrystalline bodies.

The embodiment illustrated in FIG. 1 has been illustrated as incorporating a polarizer and an analyzer oriented with their planes of polarization perpendicular to one another. In this embodiment of the invention, the the absence of an electric field, no light is passed by the device. In other embodiments of the invention, the polarizer and analyzer may have their planes of polarization in other relationships. For example, if the planes of polarization are parallel to one another, then light will be transmitted by the device in the absence of an electric field, while the presence of the field will decrease or eliminate the passage of light. Regardless of the relative orientations of the planes of polarization, a variation of the intensity of the input light will be effected by an electric field. It will be appreciated that light intensity variation in the illustrated device is accomplished through modulation of the polarization of a light beam. Accordingly, the subcombination comprising the described semicrystalline body, a light source, and means for applying an electric field thereacross has utility in and of it-

We claim:

1. A bistable electro-optic device for switching between at least two stable states the polarization characteristics of a plane polarized light beam, said device comprising;
   a transparent ferroelectric glass-ceramic body including submicroscopic crystallites embedded in a glassy matrix, the size of said crystallites being such that said material exhibits a ferroelectric hysteresis loop, said crystallites having birefringence characteristics which are modifiable in response to variations in an electric field imposed thereacross and which modified birefringence characteristics are retained after removal of said electric field, and
   means for applying an electric field across at least a portion of said body.

2. A bistable electro-optic device in accordance with claim 1 wherein the size of said crystallites is between 1,000 and 2,000 A.

3. A bistable electro-optic device in accordance with claim 2 wherein said crystallites are crystals of an oxygen-octahedral lattice configuration exhibiting a ferroelectric hysteresis loop.

4. A bistable electro-optic device in accordance with claim 1 wherein said glass-ceramic body is permanently prepolarized to the extent that a significant domain alignment is achieved.

5. A bistable electro-optic device in accordance with claim 1 wherein said glass-ceramic body is in the shape of a parallel piped and has two major planar surfaces and a plurality of end surfaces and wherein said means for applying an electric field comprises a pair of conductive electrodes disposed on two opposite end surfaces of said body.

6. A bistable electro-optic device in accordance with claim 1 wherein said means for applying an electric field comprises means for applying a prepolarizing field across at least a first portion of said body and means for applying across said first portion pulsed electric fields having equal amplitudes and opposite polarities.

7. A bistable electro-optic device in accordance with claim 1 wherein said means for applying an electric field comprises means for applying a first pulsed field of a first amplitude across at least a first portion of said body to induce a remnant polarization therein and means for applying across said first portion of said body a coercive pulsed electric field of opposite polarity from said first pulse and having an amplitude which is less than said first amplitude and which is sufficient to substantially eliminate said remnant polarization.

8. A bistable electro-optic device in accordance with claim 1 wherein said glass-ceramic body comprises a plate having at least one pair of closely spaced conductive electrodes on one surface thereof.

9. A bistable electro-optic device comprising
   an electro-optic component located on a light transmission path, said component comprising a transparent ferroelectric glass-ceramic body including submicroscopic crystallites embedded in a glassy matrix, the size of said crystallites being between about 1000 A. and 2,000 A., thereby causing said material to exhibit a ferroelectric hysteresis loop, said crystallites having birefringence characteristics which are modifiable in response to variations in an electric field imposed thereacross and which modified birefringence characteristics are retained after removal of said electric field,
   means located on said path for directing a beam of polarized light onto said electro-optic component,
   a polarization analyzer on said path for receiving light emanating from said electro-optic component, and
   means for applying an electric field across at least a portion of said electro-optic component.

10. A bistable electro-optic device comprising
    a plate of transparent ferroelectric glass-ceramic material including submicroscopic crystallites embedded in a glassy matrix, the size of said crystallites being such that said material exhibits a ferroelectric hysteresis loop, said crystallites having birefringence characteristics which are modifiable in response to variations in an electric field imposed thereacross and which modified birefringence characteristics are retained after removal of said electric field,
    a plurality of pairs of electrodes arranged in a matrix array on one surface of said plate,
    means for supplying electrical pulses to each of said pairs of electrodes,
    means for directing polarized light onto one surface of said plate, and
    a polarization analyzer disposed adjacent that surface of said plate opposite that to which said polarized light is directed.

11. A device in accordance with claim 10 wherein said means for directing polarized light provides a deflectable light beam the cross section of which is about the size of the area enclosed by each of said pairs of electrodes, said device further comprising means for detecting light emanating from said analyzing means.

12. A bistable electro-optic device in accordance with claim 4 wherein the extent to which said glass-ceramic body is permanently prepolarized is such that the direction of remnant polarization therein is always in the same direction regardless of the direction of the applied electric field.

* * * * *